United States Patent
Yamaguchi et al.

(10) Patent No.: US 11,953,247 B2
(45) Date of Patent: Apr. 9, 2024

(54) RECYCLE INFORMATION MANAGEMENT SYSTEM

(71) Applicants: DAIKIN INDUSTRIES, LTD., Osaka (JP); DAIKIN EUROPE N.V., Ostend (BE)

(72) Inventors: Takahiro Yamaguchi, Ostend (BE); Tadashi Hirose, Osaka (JP); Suguru Seikoba, Osaka (JP); Yumi Yamaguchi, Osaka (JP)

(73) Assignees: Daikin Industries, Ltd., Osaka (JP); DAIKIN EUROPE N.V., Ostend (BE)

( * ) Notice: Subject to any disclaimer, the term of this patent is extended or adjusted under 35 U.S.C. 154(b) by 502 days.

(21) Appl. No.: 17/254,709

(22) PCT Filed: Jun. 29, 2018

(86) PCT No.: PCT/JP2018/024893
§ 371 (c)(1),
(2) Date: Dec. 21, 2020

(87) PCT Pub. No.: WO2020/003509
PCT Pub. Date: Jan. 2, 2020

(65) Prior Publication Data
US 2021/0116158 A1   Apr. 22, 2021

(51) Int. Cl.
*F25B 45/00* (2006.01)
*F25B 43/00* (2006.01)
(Continued)

(52) U.S. Cl.
CPC ............ *F25B 45/00* (2013.01); *F25B 43/003* (2013.01); *F25B 43/02* (2013.01); *F25B 49/02* (2013.01);
(Continued)

(58) Field of Classification Search
CPC ........ F25B 45/00; F25B 43/003; F25B 43/02; F25B 49/02; F25B 2400/23;
(Continued)

(56) References Cited

U.S. PATENT DOCUMENTS

| | | | | |
|---|---|---|---|---|
| 5,802,859 A | * | 9/1998 | Zugibe | .................. G01G 17/06 62/149 |
| 6,141,977 A | | 11/2000 | Zugibe | |
| 2015/0161574 A1 | | 6/2015 | Feast et al. | |

FOREIGN PATENT DOCUMENTS

| | | |
|---|---|---|
| JP | 2005-302337 A | 10/2005 |
| JP | 2009-215224 A | 9/2009 |

(Continued)

OTHER PUBLICATIONS

International Search Report of corresponding PCT Application No. PCT/JP2018/024893 dated Sep. 25, 2018.
(Continued)

*Primary Examiner* — Kun Kai Ma
(74) *Attorney, Agent, or Firm* — Global IP Counselors, LLP (57) ABSTRACT

A recycle information management system includes a communication device and a management device. The communication device transmits recycle information acquired from a recycle system via a network. The recycle system includes at least a recycling device that removes at least oil from the collected refrigerant to recycle the refrigerant. The management device includes a storage unit that stores the recycle information in association with a recycle system ID usable to identify the recycle system.

18 Claims, 7 Drawing Sheets

(51) Int. Cl.
*F25B 43/02* (2006.01)
*F25B 49/02* (2006.01)

(52) U.S. Cl.
CPC ....... *F25B 2400/23* (2013.01); *F25B 2700/00* (2013.01); *F25B 2700/151* (2013.01)

(58) Field of Classification Search
CPC ............ F25B 2700/00; F25B 2700/151; F25B 2345/002; F25B 2345/003; F25B 2345/007; G06Q 10/20
See application file for complete search history.

(56) References Cited

FOREIGN PATENT DOCUMENTS

| | | |
|---|---|---|
| JP | 5048554 B2 | 10/2012 |
| JP | 2015-125672 A | 7/2015 |
| WO | 2014/085661 A2 | 6/2014 |

OTHER PUBLICATIONS

International Preliminary Report of corresponding PCT Application No. PCT/JP2018/024893 dated Jan. 7, 2021.
European Search Report of corresponding EP Application No. 18 924 128,4 dated Jan. 7, 2022.

* cited by examiner

| | | | |
|---|---|---|---|
| WORKING DATE AND TIME = ······ | | | |
| RECYCLE SYSTEM ID = ······ | | | |
| RECYCLING DEVICE | COMPRESSOR | VOLTAGE | X1[V] |
| | | CURRENT | Y1[A] |
| | ELECTROSTATIC SEPARATION DEVICE | VOLTAGE | X2[V] |
| | | CURRENT | Y2[A] |
| | FILTER DRYER | WHETHER OR NOT FILTER IS REPLACED | NO |
| | | PERIOD OF USE | H[HOURS] |
| INSPECTION RESULT (INSPECTION DEVICE) | | OIL | APPROPRIATE |
| | | MOISTURE | APPROPRIATE |
| | | ACID CONTENT | APPROPRIATE |
| TYPE OF REFRIGERANT (COMPOSITION ANALYZING DEVICE) | | R401A | |
| WEIGHT MEASUREMENT DEVICE | | W[Kg] | |

FIG. 4

| WORKING DATE AND TIME | RECYCLE SYSTEM ID | RECYCLE OPERATOR ID | NAME OF RECYCLE OPERATOR | RECYCLE CYLINDER ID |
|---|---|---|---|---|
| ······ | ······ | ······ | ······ | ······ |
| ······ | ······ | ······ | ······ | ······ |
| ······ | ······ | ······ | ······ | ······ |

RECYCLE INFORMATION MANAGEMENT SYSTEM

BACKGROUND

Field of the Invention

The present disclosure relates to a recycle information management system.

Background Information

Conventionally, used chlorofluorocarbon is collected and impurities such as refrigerating machine oil and moisture are removed from it for reuse (see JP5048554B2 for example). Furthermore, there have been increasing needs for chlorofluorocarbon reuse along with stricter regulation of chlorofluorocarbon use.

SUMMARY

Chlorofluorocarbon is reused depending on user determination. Accordingly, there is a possibility that it becomes difficult to grasp how much degree of chlorofluorocarbon is reused after release into market of products such as air conditioners including chlorofluorocarbon as a refrigerant.

A recycle information management system according to a first aspect includes a communication device and a management device. The communication device transmits recycle information acquired from a recycle system via a network. The recycle system includes a recycling device that removes at least oil from a collected refrigerant to recycle the refrigerant. The management device includes a storage unit that stores the recycle information in association with a recycle system ID for identification of the recycle system. Such a configuration enables the management device to precisely capture recycled degree of the collected refrigerant.

A recycle information management system according to a second aspect is the recycle information management system according to the first aspect, in which the communication device further transmits information on a type of a refrigerant to be recycled. Such a configuration enables the management device to manage the type of the refrigerant to be recycled.

A recycle information management system according to a third aspect is the recycle information management system according to the first or second aspect, in which the communication device transmits the recycle information between start and end of recycling operation of recycling the refrigerant with use of the recycling device, and/or after elapse of predetermined time from the end of the recycling operation. Such a configuration enables the management device to recognize operation of the recycling device.

A recycle information management system according to a fourth aspect corresponds to the recycle information management system according to any one of the first to third aspects, in which the recycle information includes at least one of information on applied voltage or applied current to a compressor, or information on applied voltage or applied current to an electrostatic separation device. Note that, in this case, the recycling device includes the compressor and/or the electrostatic separation device configured to remove oil from a collected refrigerant. Such a configuration enables the management device to recognize whether or not at least one of the compressor or the electrostatic separation device is in operation.

A recycle information management system according to a fifth aspect is the recycle information management system according to any one of the first to fourth aspects, in which the recycle information includes filter replacement information indicating at least one of whether or not a filter dryer needs to be replaced, or whether or not the filter dryer has been replaced. Note that, in this case, the recycling device includes the filter dryer that removes moisture from a collected refrigerant. Such a configuration enables the management device to manage necessity for replacement of the filter dryer and quality of the refrigerant to be recycled.

A recycle information management system according to a sixth aspect is the recycle information management system according to any one of the first to fifth aspects, in which the recycle information includes a result of inspection by an inspection device. Note that, in this case, the recycle system further includes the inspection device that inspects appropriateness regarding quantity of at least one of oil, moisture, or acid content in a refrigerant recycled by the recycling device. Such a configuration enables the management device to manage quality of the recycled refrigerant.

A recycle information management system according to a seventh aspect is the recycle information management system according to any one of the first to sixth aspects, in which the recycle information includes information on weight of the recycled refrigerant. Note that, in this case, the recycle system further includes a weight measurement device that measures weight of a refrigerant recycled by the recycling device. Such a configuration enables the management device to manage quantity of the recycled refrigerant.

A recycle information management system according to an eighth aspect corresponds to the recycle information management system according to any one of the first to seventh aspects, in which the recycle information includes information on composition of the recycled refrigerant. Note that, in this case, the recycle system further includes a composition analyzing device that analyzes composition of a refrigerant recycled by the recycling device. Such a configuration enables the management device to manage the composition of the recycled refrigerant.

A recycle information management system according to a ninth aspect is the recycle information management system according to any one of the first to eighth aspects, in which the management device further includes a diagnostic unit that diagnoses a degraded state of the recycling device based on the recycle information. Such a configuration enables the management device to determine the degraded state of the recycling device.

A recycle information management system according to a tenth aspect is the recycle information management system according to any one of the first to ninth aspects, in which the communication device includes an information input device provided separately from the recycling device. With such a configuration, the system can be easily constructed since the recycling device does not need to have a communicating function.

A recycle information management system according to an eleventh aspect is the recycle information management system according to any one of the first to ninth aspects, in which the communication device is incorporated in the recycling device, and the recycling device transmits the recycle information to the management device. Such a configuration achieves enhanced convenience of a user of the system.

A recycle information management system according to a twelfth aspect is the recycle information management system according to any one of the first to eleventh aspects, in which the communication device receives, as input information in association with the recycle system ID, at least one of a recycle cylinder ID for identification of a recycle cylinder reserving the refrigerant to be recycled, a name of a recycle operator recycling the refrigerant, or a recycle operator ID for identification of the recycle operator. The communication device transmits the input information to the management device. Such a configuration enables management of the input information on recycling work, in association with the recycle information.

A recycle information management system according to a thirteenth aspect is the recycle information management system according to any one of the first to twelfth aspects, in which the management device further includes an output unit that outputs a recycle certificate certifying that the refrigerant is recycled by the recycle system, in association with the input information. Such a configuration enables issue of the recycle certificate on the recycling work.

A recycle information management system according to a fourteenth aspect is the recycle information management system according to any one of the first to thirteenth aspects, in which the storage unit stores recycle information transmitted from a plurality of the recycle systems. Such a configuration enables the management device to manage the information on the plurality of recycle systems.

A recycle information management system according to a fifteenth aspect is the recycle information management system according to any one of the first to fourteenth aspects, in which the recycle system outputs image data indicating the recycle information. The communication device receives the image data. The management device acquires the recycle information from the image data. Such a configuration achieves enhanced convenience of the user of the system.

DETAILED DESCRIPTION OF EMBODIMENT(S)

(1) Collection and Recycle of Refrigerant

Figure 1:
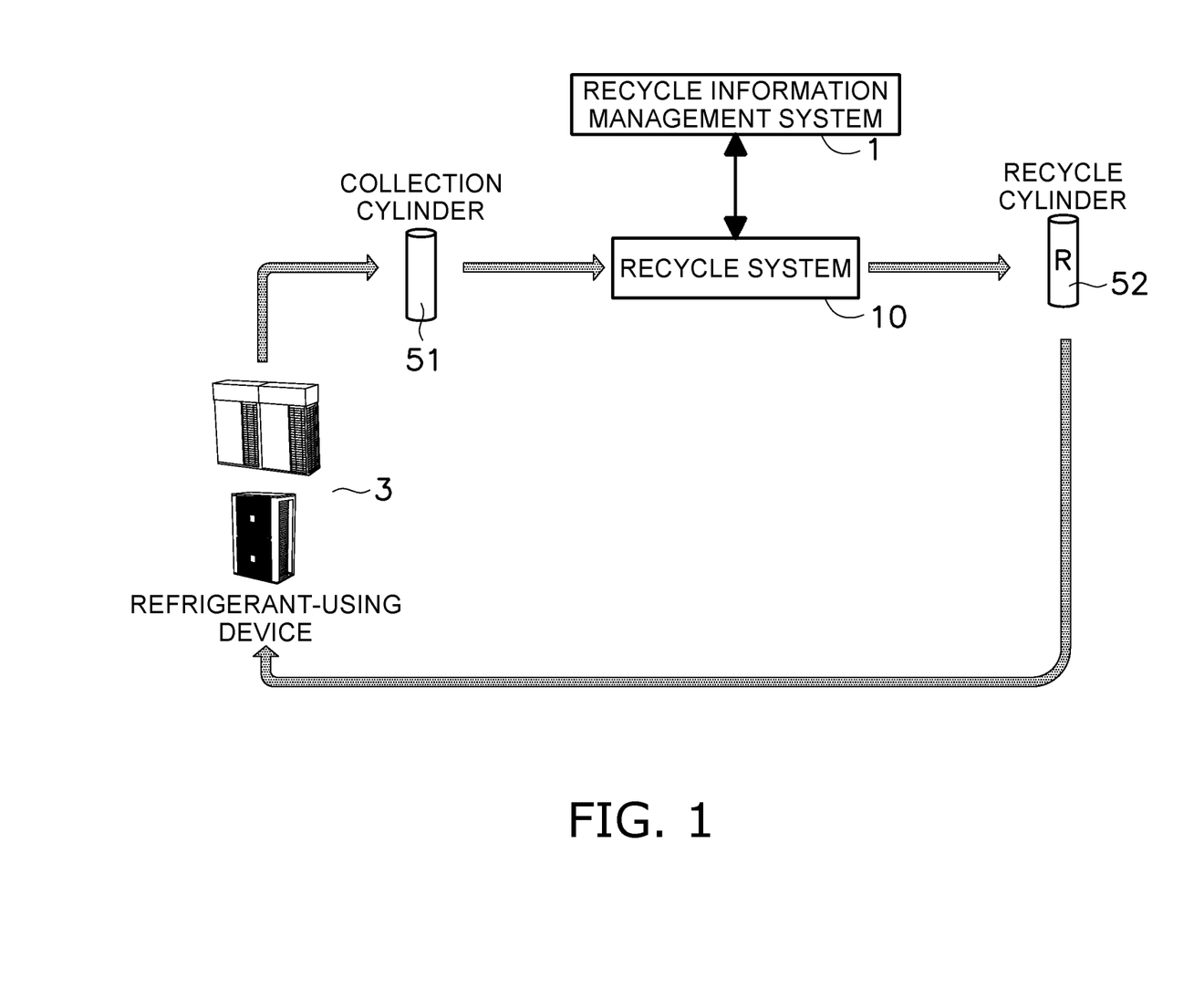
FIG. 1 is a schematic explanatory diagram of collection and recycle of a refrigerant.

FIG. 1 is a schematic explanatory diagram on concepts of collection and recycle of a refrigerant.

When a refrigerant-using device 3 including chlorofluorocarbon as a refrigerant is released into a market, typically, the refrigerant included in the refrigerant-using device 3 is eventually collected into a collection cylinder 51. The refrigerant collected into the collection cylinder 51 is recycled by a recycle system 10 or is destroyed at a chemical plant or the like.

Specifically, the expression "recycle" executed by the recycle system 10 indicates bringing a refrigerant into a reusable state without component adjustment. Component adjustment of a refrigerant may also be called reclaim or reclamation, which should be distinguished from recycle according to the present disclosure. The expression "a recycled refrigerant" indicates a collected refrigerant from which impurities such as oil are removed. A collected refrigerant that needs to be subjected to component adjustment is transferred to a chemical plant or the like for rectification and separation, destruction, or the like. Whether or not a recycled refrigerant needs to be inspected in terms of its composition depends on a type of the refrigerant. Examples of a refrigerant not always needed to be inspected in terms of its composition include a single composition refrigerant and a pseudoazeotropic refrigerant.

Figure 2:
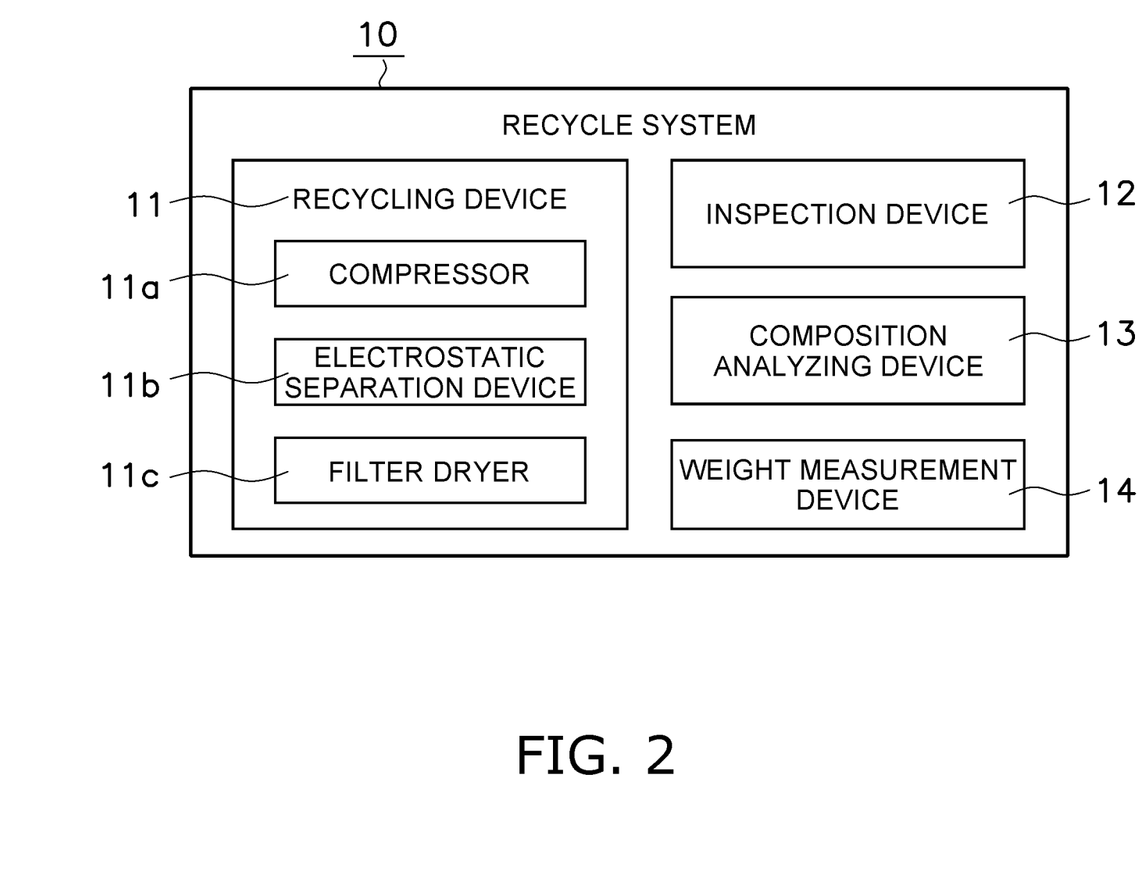
FIG. 2 is a schematic explanatory diagram depicting a configuration of a recycle system 10.

(2) Configurations of Recycle System and Recycle Information Management System (2-1) Configuration of Recycle System The recycle system 10 removes at least oil from a collected refrigerant to recycle the refrigerant. The "collected refrigerant" may correspond to a refrigerant recycled simultaneously with collection. Specifically, the collected refrigerant may be collected from a refrigerant circuit in the refrigerant-using device 3 and directly imported into the recycle system 10.

As depicted in FIG. 2, this recycle system 10 includes a recycling device 11, an inspection device 12, a composition analyzing device 13, and a weight measurement device 14. Recycle information obtained from the recycle system 10 is timely transmitted to a recycle information management system 1 to be described later.

The recycling device 11 includes a compressor 11a, an electrostatic separation device 11b, and a filter dryer 11c. The recycling device 11 removes mainly oil from a refrigerant with use of a refrigerant circuit including at least one of the compressor 11a and the electrostatic separation device 11b. The recycling device 11 removes mainly moisture from a refrigerant with use of the filter dryer 11c.

The inspection device 12 inspects appropriateness regarding quantity of at least one of oil, moisture, and acid content in a refrigerant. The inspection device 12 may be provided with an inspection sheet that is changed in color upon contact with a refrigerant and inspect with use of the inspection sheet.

The composition analyzing device 13 analyzes composition of a refrigerant. The composition analyzing device 13 also has a function of printing and outputting a result of analysis on a receipt or the like.

The weight measurement device 14 measures weight of a refrigerant.

(2-2) Configuration of Recycle Information Management System

Figure 3:
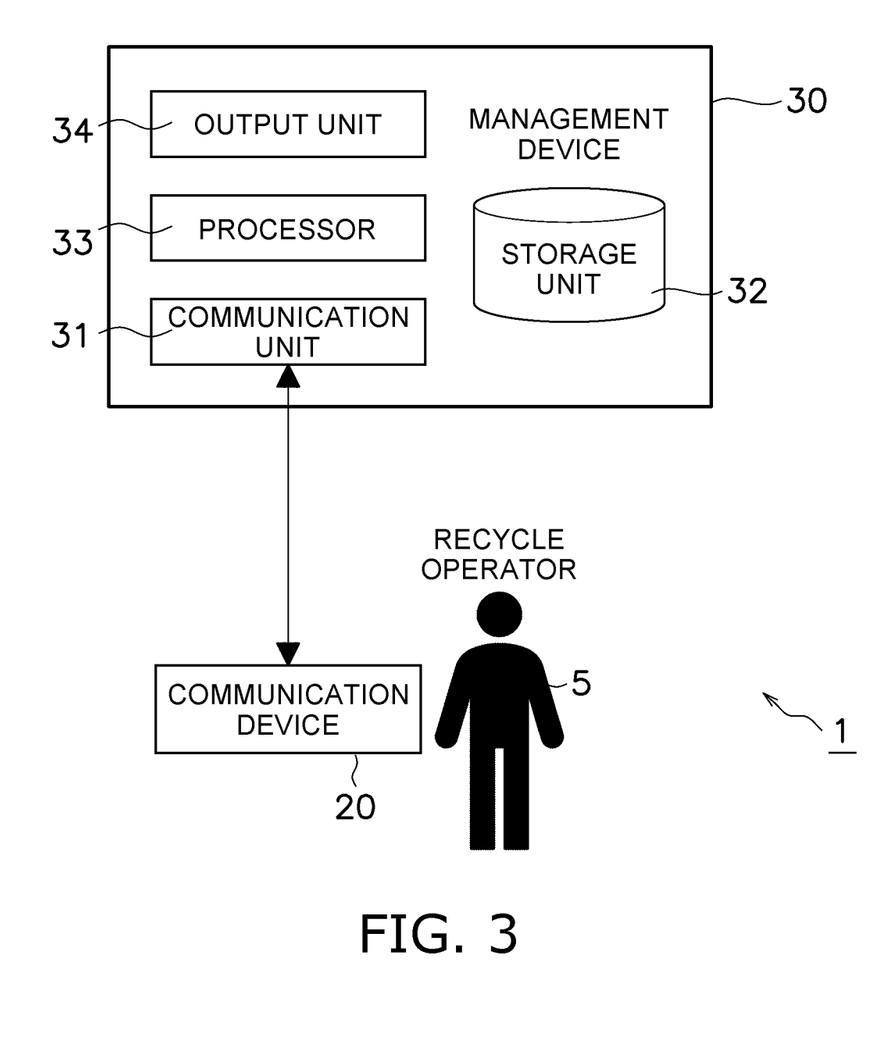
FIG. 3 is a schematic explanatory diagram depicting a configuration of a recycle information management system 1.

The recycle information management system 1 manages information acquired from the recycle system 10, and includes a communication device 20 and a management device 30 as depicted in FIG. 3.

The communication device 20 is used by a recycle operator 5 when recycling the refrigerant and transmits, to the management device 30 via a network, the recycle information to be described later and other input information. The communication device 20 is implemented by an information input device such as a smart device or a personal computer provided separately from the recycle system 10, on which a recycle information transmission program is installed. The communication device 20 transmits the recycle information between start and end of recycling operation of recycling a refrigerant with use of the recycling device 11, and/or after elapse of predetermined time from the end of the recycling operation.

The management device 30 manages the recycle information transmitted from the communication device 20, and includes a communication unit 31, a storage unit 32, a processor 33, and an output unit 34.

The communication unit 31 is implemented by a network card or the like, and has a function of communicating with an external device on the network.

Figure 4:
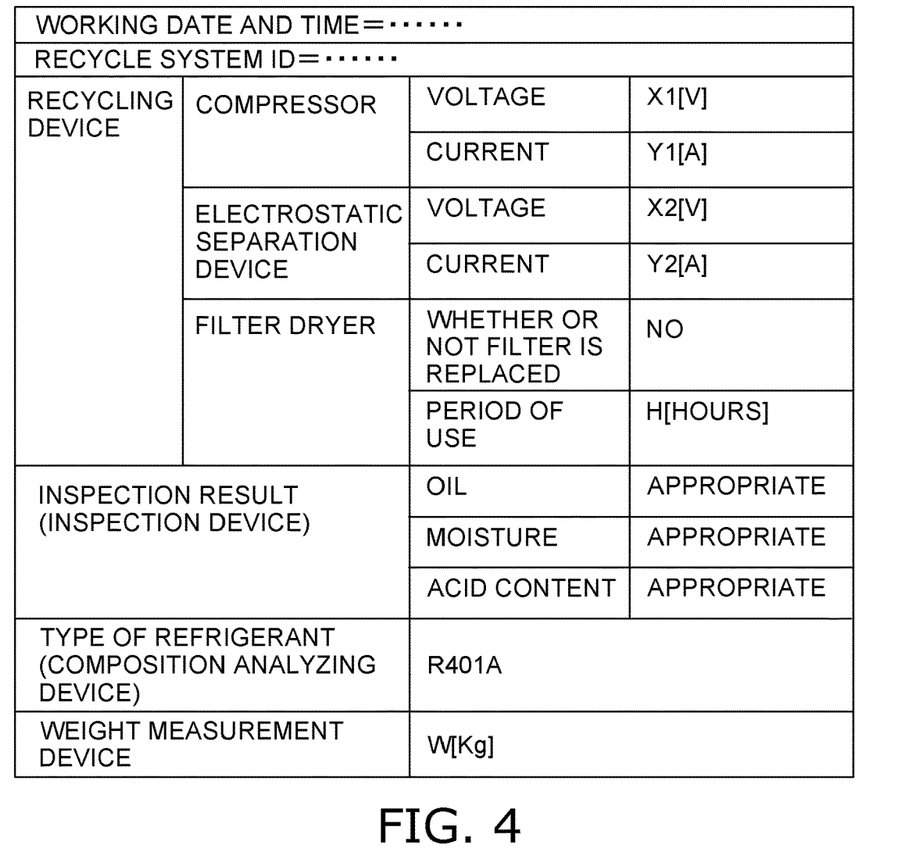
FIG. 4 is a schematic explanatory chart of information stored in a storage unit 32.

The storage unit 32 includes a storage device such as a ROM and a RAM, and stores recycle information received from the communication device 20. The storage unit 32 also stores recycle information transmitted from a plurality of recycle systems. Specifically, the storage unit 32 stores, as indicated in FIG. 4, the recycle information in association with a recycle system ID for identification of the recycle system 10 and a working date and time of recycling work.

Examples of the "recycle information" include a period of use of the compressor 11a, applied voltage to the compressor 11a, applied current to the compressor 11a, a period of use of the electrostatic separation device 11b, applied voltage to the electrostatic separation device 11b, applied current to the electrostatic separation device 11b, filter replacement information indicating at least one of whether or not the filter dryer 11c needs to be replaced and whether or not the filter dryer 11c has been replaced, a period of use of the filter dryer 11c, a result of inspection by the inspection device 12, a result of analysis by the composition analyzing device 13, and a result of measurement by the weight measurement device 14. The examples of the recycle information also include refrigerant system temperature in the recycling device 11. The storage unit 32 may store at least information enabling a check of the operation of the recycling device 11 for management of a refrigerant to be recycled. The storage unit 32 may store at least one of the above examples of the recycle information. Even in an exemplary case where the storage unit 32 stores only information on the applied voltage or the applied current to the compressor 11a, it is possible to determine appropriate execution of recycling work.

Figure 5:
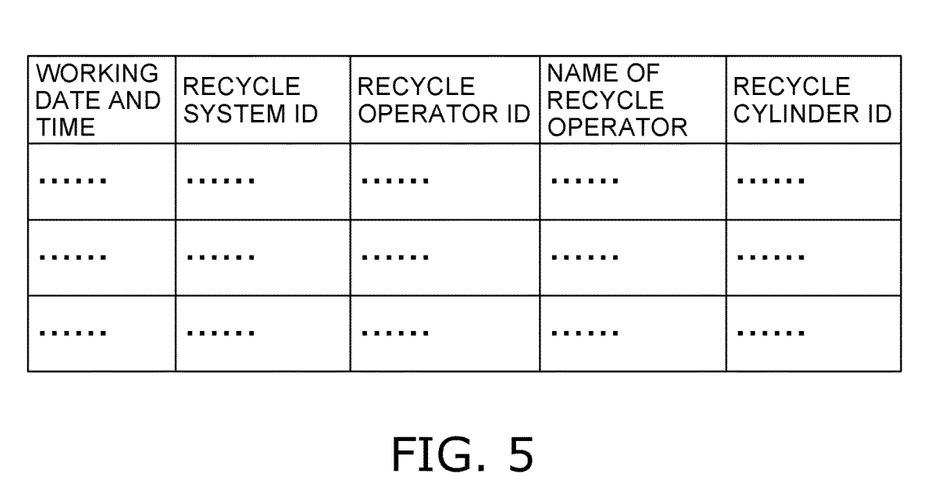
FIG. 5 is a schematic explanatory chart of another information stored in the storage unit 32.

The storage unit 32 further acquires the input information inputted to the communication device 20 by the recycle operator 5, and stores the acquired input information in association with the recycle system ID and the working date and time. Examples of the "input information" inputted by the recycle operator 5 include, as indicated in FIG. 5, a recycle cylinder ID for identification of a recycle cylinder 52 reserving a refrigerant to be recycled, a name of the recycle operator 5 recycling the refrigerant, and a recycle operator ID for identification of the recycle operator 5. All the examples of the input information are not always needed if the refrigerant to be recycled can be specified. For example, the recycle operator 5 may not be necessarily specified if the recycle cylinder 52 is specified by the recycle cylinder ID. Furthermore, the recycle operator 5 does not always need to input the name of the recycle operator 5 and the recycle operator ID. Once the recycle operator ID and the name of the recycle operator 5 are associated with each other, input of the recycle operator ID leads to no need to input the name of the recycle operator 5.

The processor 33 processes information in the management device 30. In this embodiment, the processor (diagnostic unit) 33 processes to diagnose a degraded state of the recycling device 11 based on the recycle information. The processor 33 further generates data of a recycle certificate certifying that a refrigerant is recycled by the recycle system 10, in association with the input information transmitted by the recycle operator 5. Functions of the processor 33 are implemented through reading a program stored in the storage device (e.g. a ROM or a RAM) into a central processing unit (CPU) of a computer. The processor 33 is not limited to the above configuration. The processor 33 may alternatively be implemented with hardware using large-scale integration (LSI), an application specific integrated circuit (ASIC), a field-programmable gate array (FPGA), or the like.

The output unit 34 includes an output device, and outputs various types of information in the management device 30. The output unit 34 outputs a recycle certificate based on the data of the recycle certificate generated by the processor 33. The data of the recycle certificate may alternatively be transmitted to the communication device 20 via the communication unit 31 or the like. In this case, the output device outputs the recycle certificate to the communication device 20 that is connected the appropriate output device. For example, the recycle certificate generated by means of electronic data in a PDF format is outputted from a printer or the like connected to the communication device 20. The recycle certificate may be outputted onto a paper medium for use, or may be used in an electronic data format.

(3) Operation in Recycle System and Recycle Information Management System

(3-1) Refrigerant Recycling

Figure 6:
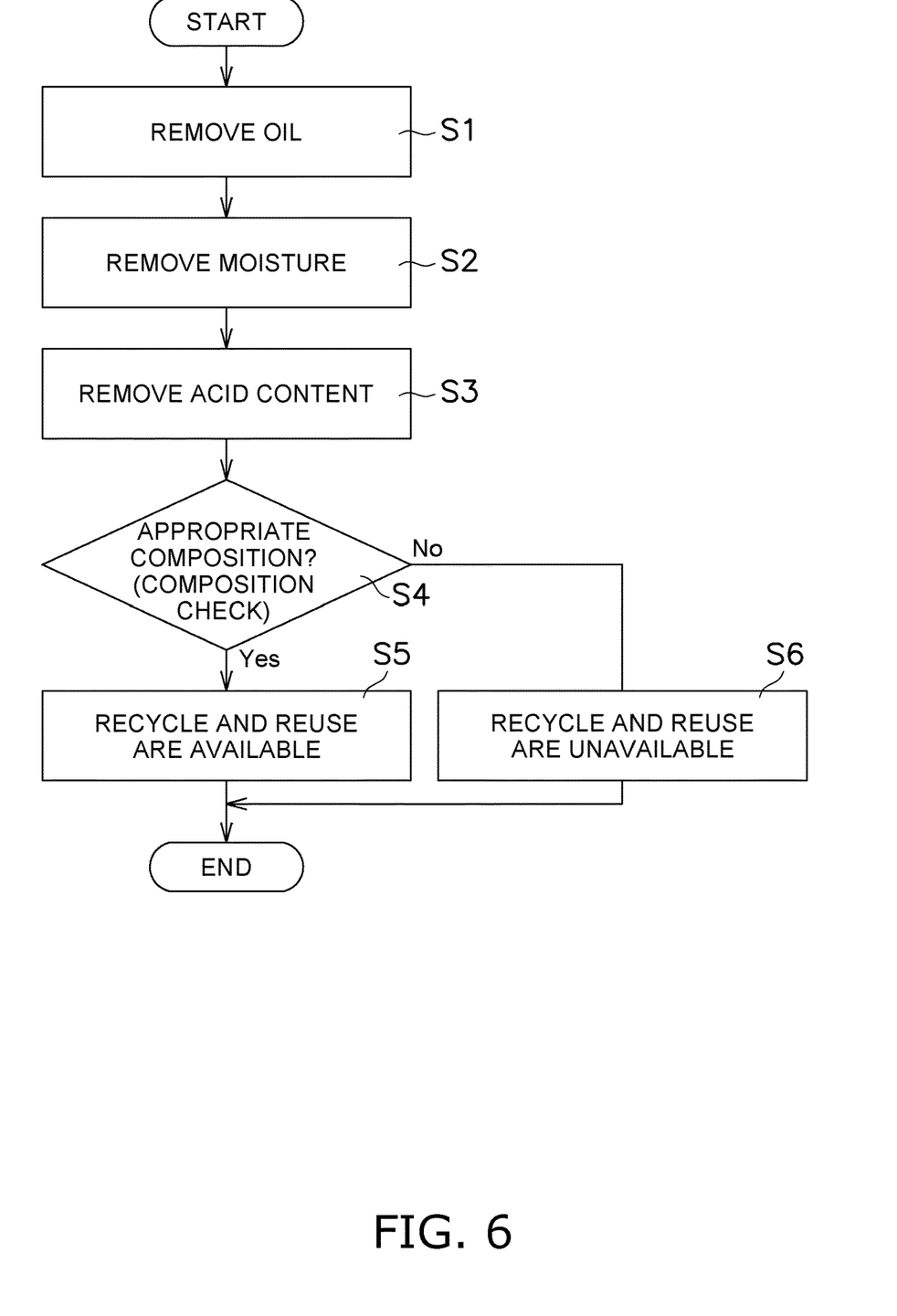
FIG. 6 is an explanatory flowchart of "recycling" executed by the recycle system 10.

FIG. 6 is an explanatory flowchart of "recycling" executed by the recycle system 10.

A refrigerant collected from the refrigerant-using device 3 including the refrigerant is recycled with use of the recycling device 11. Specifically, a used refrigerant reserved in the collection cylinder 51 is transferred to the recycle operator 5. The recycle operator 5 recycles, with use of the recycling device 11, the refrigerant reserved in the collection cylinder 51. The present disclosure is not limited to the above configuration, but a refrigerant may alternatively be collected from the refrigerant circuit in the refrigerant-using device 3 and be directly imported into the recycling device 11 to recycle the refrigerant.

In order for recycling operation of the recycling device 11, the recycle operator 5 connects the collection cylinder 51 and the recycle cylinder 52 to the recycling device 11. The used refrigerant reserved in the collection cylinder 51 is then transferred to the recycling device 11. The recycling device 11 removes oil from the collected refrigerant by means of functions of mainly the compressor 11a and the electrostatic separation device 11b (S1). Moisture and acid content are removed mainly by the filter dryer 11c (S2 and S3). The refrigerant from which oil, moisture, and acid content are removed is then transferred to be reserved in the recycle cylinder 52.

The recycle operator 5 subsequently performs inspection and the like of the refrigerant in the recycle cylinder 52, with the inspection device 12, the composition analyzing device 13, and the weight measurement device 14 (S4).

In a case where the refrigerant reserved in the recycle cylinder 52 is inspected and is found to be appropriate, the refrigerant reserved in the recycle cylinder 52 is recognized as being reusable (Yes in S4 and S5).

In another case where the refrigerant reserved in the recycle cylinder 52 is inspected and is found to be inappropriate, the refrigerant reserved in the recycle cylinder 52 is determined as being unreusable (No in S4 and S6). When the refrigerant is determined as being unreusable, the recycle cylinder 52 is transferred to a chemical plant or the like. The refrigerant is then subjected to component adjustment or is destroyed at the chemical plant or the like.

When the recycling described above is executed, the recycle operator 5 transmits as needed, the recycle information to the management device 30 via the communication device 20. The recycle operator 5 also inputs, to an input interface of the communication device 20, the recycle cylinder ID for identification of the recycle cylinder 52 reserving a refrigerant to be recycled, the name of the recycle operator 5 recycling the refrigerant, the recycle operator ID for identification of the recycle operator 5, or the like. The input information inputted to the communication device 20 is transmitted to the management device 30 as needed.

In this embodiment, the communication device 20 transmits, to the management device 30, the recycle information between start and end of recycling operation of recycling a refrigerant with use of the recycling device 11, and/or after elapse of predetermined time from the end of the recycling operation.

(3-2) Issue of Recycle Certificate

Figure 7:
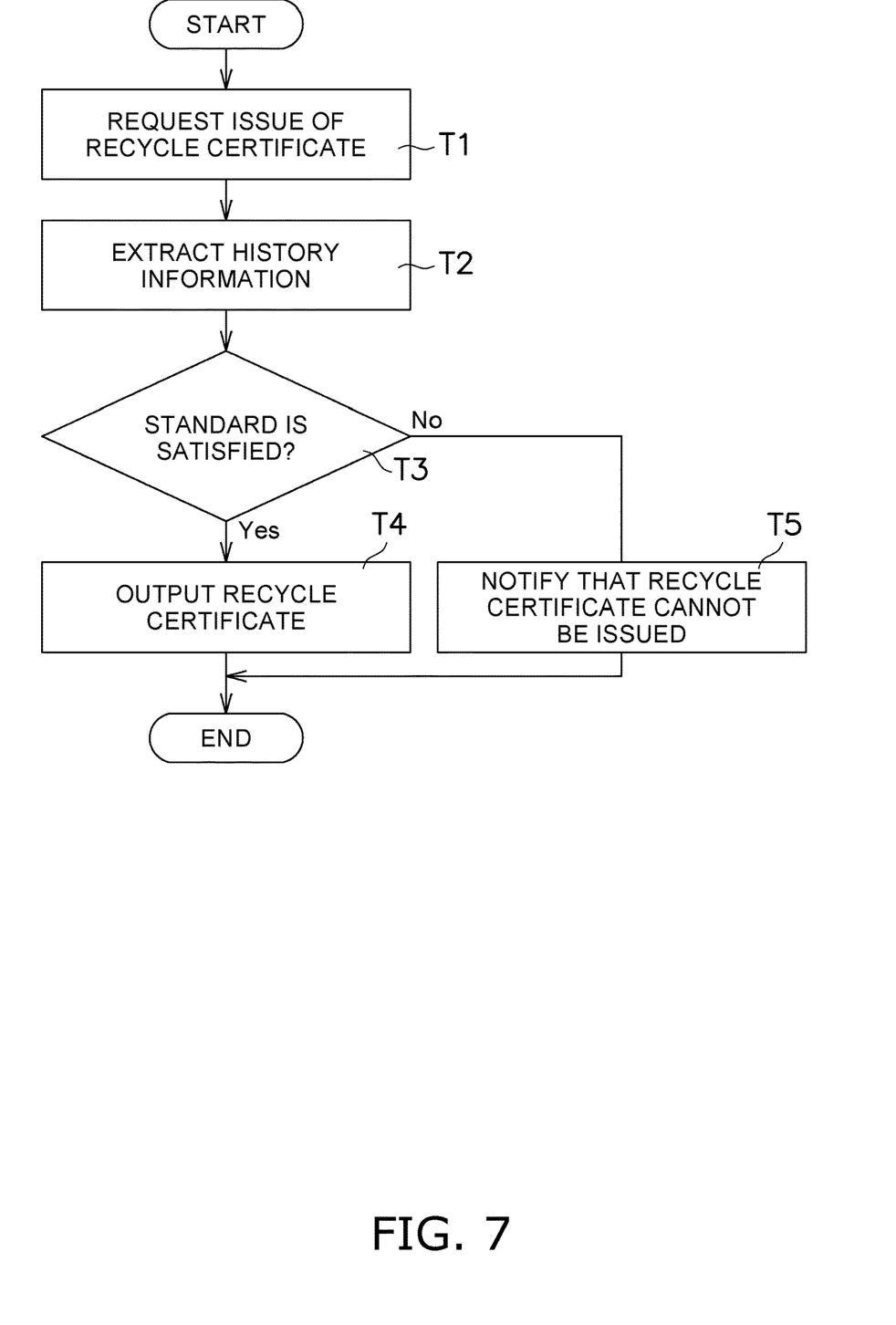
FIG. 7 is an explanatory flowchart of "issue of recycle certificate" executed by the recycle information management system 1.

FIG. 7 is an explanatory flowchart of "issue of recycle certificate" executed by the recycle information management system 1.

The recycle information management system 1 issues a recycle certificate according to a request. The "recycle certificate" referred to in this case corresponds to information certifying usability of a recycled refrigerant. To the "recycle certificate", information for specification of at least one of the recycle cylinder 52, the recycle operator 5, or the recycle system 10, are reflected. The "recycle certificate" is outputted in an appropriate format.

Specifically, the recycle operator 5 transmits, to the management device 30 via the communication device 20, an issue request for a recycle certificate (T1). On this occasion, at least one of the recycle cylinder ID, the name of the recycle operator 5, or the recycle operator ID is transmitted to the management device 30.

When receiving the issue request for the recycle certificate, the management device 30 extracts, from the storage unit 32, history information associated with the recycle system ID, the recycle operator ID, and the like (T2).

The management device 30 subsequently determines whether or not the history information satisfies a standard for issue of a recycle certificate based on the recycle system ID, the recycle operator ID, or the like (T3). The standard for issue of a recycle certificate is determined based on a refrigerant quality standard or the like. In an exemplary case, when a recycled refrigerant contains moisture having a value not exceeding a predetermined value, a residue on evaporation having a value not exceeding a predetermined value, or acid content having a value not exceeding a predetermined value, the refrigerant is determined as satisfying a certain quality standard. Examples of laws and regulations providing such quality standards include AHR1700 of the United States of America. Alternatively, separately from the above mentioned quality standards, a company supposed to issue recycle certificates or the like can provide original reference values. Still alternatively, the recycling device 11 or the like is determined in terms of a degraded state and a dirtied state thereof, and a state with no or small degradation or dirt can be set as the standard for issue of a recycle certificate.

In a case where the management device 30 determines that the standard is satisfied, the management device 30 prepares a recycle certificate and outputs the recycle certificate to the communication device 20 (Yes in T3 and T4). In another case where the management device 30 determines that the standard is not satisfied, the management device 30 prepares a notification that a recycle certificate cannot be issued and outputs the notification to the communication device 20 (No in T3 and T5).

(3-3) Diagnosis of Recycling Device

Figure 8:
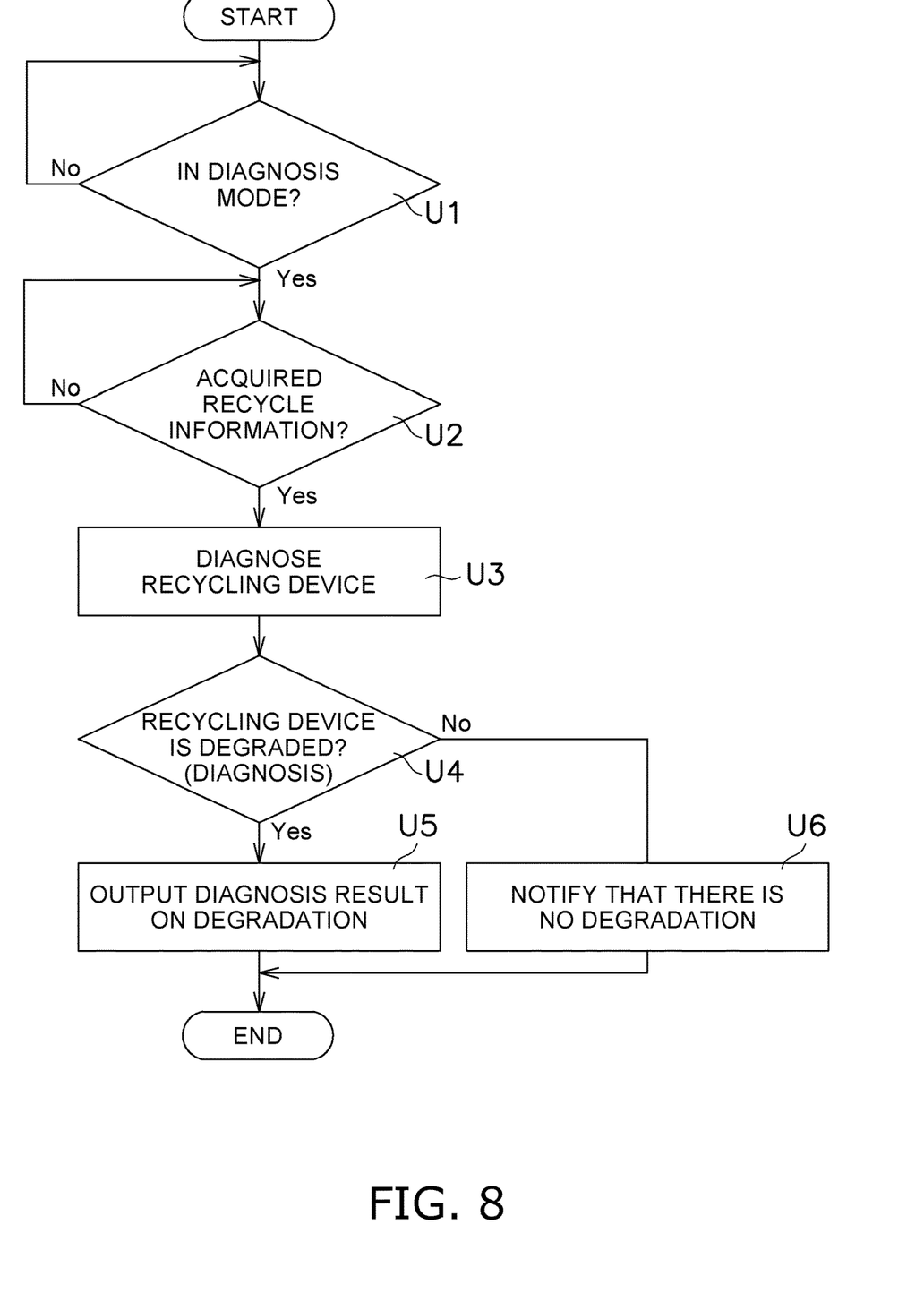
FIG. 8 is an explanatory flowchart of "diagnosis of recycling device" executed by the recycle information management system 1.

FIG. 8 is an explanatory flowchart of "diagnosis of recycling device" executed by the recycle information management system 1.

The management device 30 in the recycle information management system 1 timely diagnoses the recycling device 11. For example, when the recycle operator 5 or the like sets a diagnosis mode of the management device 30 via the communication device 20, the management device 30 diagnoses the recycling device 11.

When the management device 30 is in the diagnosis mode (Yes in U1) and acquires recycle information via the communication device 20 (Yes in U2), the management device 30 diagnoses the recycling device 11 based on the recycle information (U3).

In this case, the management device 30 diagnoses degraded degree of the compressor 11a based on at least one of the period of use, the applied voltage to the compressor 11a, or the applied current to the compressor 11a. The management device 30 further diagnoses degraded degree of the electrostatic separation device 11b based on at least one of the period of use of the electrostatic separation device 11b, the applied voltage to the electrostatic separation device 11b, or the applied current to the electrostatic separation device 11b. The management device 30 moreover diagnoses a degraded state of a filter based on the period of use of the filter dryer 11c. The management device 30 also diagnoses whether or not there is abnormality based on the refrigerant system temperature or the like in the recycling device 11.

In a case where the management device 30 determines that the recycling device 11 is degraded through comparison with the reference value, the management device 30 outputs a result of diagnosis on degradation to the communication device 20 (Yes in U4 and U5). In another case where the management device 30 determines that the recycling device 11 is not degraded, the management device 30 outputs a notification thereof to the communication device 20 (No in U4 and U6).

Alternatively, the notification may be made only upon determination that there is degradation in step U4, and processing in step U6 may be skipped.

(4) Characteristics (4-1)

As described above, in the recycle information management system 1 according to the present embodiment, the management device 30 stores recycle information acquired from the recycle system 10 via the communication device 20, and can thus precisely capture recycled degree of a collected refrigerant. Further, since the storage unit 32 in the management device 30 stores recycle information on a plurality of recycle systems, the management device 30 can integrally manage refrigerants recycled in the plurality of recycle systems.

For example, adoption of the recycle information management system 1 allows a manager or the like of the management device 30 to smoothly provide the recycle operator 5 with service such as granting incentive to recycling.

(4-2)

In the recycle information management system 1, the communication device 20 receives, as input information, at least one of the recycle cylinder ID for identification of the recycle cylinder 52 reserving a refrigerant to be recycled, the name of the recycle operator 5 recycling the refrigerant, or the recycle operator ID for identification of the recycle operator 5. The communication device 20 then transmits the input information to the management device 30. Such a configuration enables the management device 30 to manage the input information on recycling work, in association with the recycle information. The input information is associated with the recycle system ID.

The management device 30 further includes the output unit 34 that outputs a recycle certificate certifying that a refrigerant is recycled by the recycle system 10, in association with the input information, and a user of the recycling device 11 can therefore acquire the recycle certificate on the recycling work. The storage unit 32 stores an issue history of recycle certificates, and the like. There is also prepared a ledger from the issue history.

Issue of recycle certificates with use of this recycle information management system 1 can enhance reliability regarding the quality of a recycled refrigerant. This leads to quality maintenance of the recycled refrigerant and promotion to a consumer of reuse of the refrigerant.

Even in an exemplary case where chlorofluorocarbon refrigerant emission is limited by legal restrictions, a refrigerant user company can certify its own small chlorofluorocarbon refrigerant emission by means of a recycle certificate issued by the manager.

(4-3)

In the recycle information management system 1, the management device 30 further includes the processor 33 (diagnostic unit) that diagnoses a degraded state of the recycling device 11 based on the recycle information, and can thus determine the degraded state of the recycling device 11. Such a configuration achieves notification of a diagnosis result to the recycle operator 5 or the manager of the management device 30 for warning.

(4-4)

In the recycle information management system 1, the communication device 20 transmits information on a type of the refrigerant to be recycled. Such a configuration enables the management device 30 to manage the type of the refrigerant to be recycled. For example, determination of whether or not the refrigerant is of a recyclable type enables management of distinction between refrigerants to be recycled and refrigerants needed to be destroyed or the like.

The communication device 20 further transmits the recycle information between start and end of recycling operation of recycling the refrigerant with use of the recycling device 11, and/or after elapse of predetermined time from the end of the recycling operation. Such a configuration enables the management device to recognize operation of the recycling device 11.

The communication device 20 includes an information input device provided separately from the recycling device 11. With such a configuration, the system can be easily constructed since the recycling device 11 does not need to have a communicating function.

(4-5)

The recycling device 11 includes at least one of the compressor 11a and the electrostatic separation device 11b. The recycle information includes at least one of information on applied voltage or applied current to the compressor 11a, or information on applied voltage or applied current to the electrostatic separation device 11b. The management device 30 can thus recognize whether or not at least one of the compressor 11a and the electrostatic separation device 11b is in operation. The management device 30 can accordingly capture recycled degree of the collected refrigerant.

The recycling device 11 further includes the filter dryer 11c. The recycle information includes filter replacement information indicating at least one of whether or not the filter dryer 11c needs to be replaced, or whether or not the filter dryer 11c has been replaced. The management device 30 can thus recognize necessity for replacement of the filter dryer 11c. The management device 30 can accordingly manage quality of the refrigerant to be recycled. The management device 30 can determine necessity for filter replacement based on time elapsed from previous acquisition of recycle information.

(4-6)

The recycle system 10 further includes the inspection device 12 that inspects appropriateness regarding quantity of at least one of oil, moisture, or acid content in the refrigerant recycled by the recycling device 11. Since the recycle information includes a result of inspection by the inspection device 12, the management device 30 can manage quality of the recycled refrigerant.

The recycle system 10 further includes the composition analyzing device 13 that analyzes composition of the refrigerant recycled by the recycling device 11. Since the recycle information includes information on the composition of the recycled refrigerant, the management device 30 can manage the composition of the recycled refrigerant. In an exemplary case where the recycled refrigerant has large change in terms of its composition, the refrigerant can be determined as failing to satisfy the quality standard and can be distinguishingly managed so as not to be reused.

The recycle system 10 further includes the weight measurement device 14 that measures weight of the refrigerant recycled by the recycling device 11. Since the recycle information includes information on the weight of the recycled refrigerant, the management device 30 can manage quantity of the recycled refrigerant.

(5) Modification Examples (5-1) Modification Example A

The recycle information management system 1 described above may alternatively be configured to allow the recycle operator 5 to input at least one of the recycle information and the input information by means of image data. Specifically, the recycle system 10 outputs image data indicating the recycle information or the like. In this case, the communication device 20 includes an imaging device that receives the image data input. The management device 30 then analyses the image data to acquire the recycle information. Since this configuration allows a user of the system to input the recycle information or the like by means of the image data acquisition, it can enhance convenience of the user of the system. For example, an image indicating change in color of an inspection sheet adopted in the inspection device 12, or an image of a receipt indicating a result of analysis outputted from the composition analyzing device 13 can be transmitted to the management device 30 without being processed, and the management device 30 can read the recycle information or the like from the image data. Such a configuration can reduce data input operation with the communication device 20, to achieve enhanced convenience of the user of the system.

(5-2) Modification Example B

The communication device 20 and the recycle system 10 are provided separately from each other in the recycle information management system 1 described above. The recycle information management system according to the present embodiment is, however, not limited to such a configuration.

For example, the communication device 20 may alternatively be incorporated in the recycling device 11, and the recycling device 11 may transmit recycle information to the management device 30. Such a configuration enables the recycling device 11 to transmit the recycle information directly to the management device 30 without data input to the communication device 20 by the user of the system. Such a configuration achieves enhanced convenience of a user of the system.

(5-3) Modification Example C

In the recycle information management system 1 described above, the recycle system 10 includes the inspection device 12, the composition analyzing device 13, and the weight measurement device 14. Part or all of these devices are not always essential and may be excluded where appropriate. Such exclusion of any of these devices correspondingly leads to appropriate exclusion from contents of the recycle information.

(5-4) Modification Example D

The management device 30 described above includes the processor 33 (diagnostic unit) configured to diagnose a degraded state of the recycling device 11. Such a diagnosing function may alternatively be provided to the recycle system 10 or the recycling device 11. In this case, the recycle system 10 or the recycling device 11 includes a storage unit configured to store information necessary for diagnosis.

Other Embodiments

The embodiment has been described above. Various modifications to modes and details will be available without departing from the object and the scope of the claims.

In other words, the present disclosure is not limited only to the above embodiment. The present disclosure can be embodied, upon implementation, with any modification to any constituent element within a range not departing from the gist. The present disclosure can be presented in various manners with appropriate combinations of a plurality of constituent elements disclosed in the respective embodiments. For example, some may be excluded from all the constituent elements according to the embodiments. Furthermore, constituent elements according to different embodiments may be combined with each other where appropriate.

What is claimed is:

1. A recycle information management system comprising:
a communication device configured to transmit, via a network, recycle information acquired from a recycle system at least including a recycling device configured to remove at least oil from a collected refrigerant to recycle the refrigerant, the recycling device including an electrostatic separation device configured to remove oil from a collected refrigerant, and
a computer including a memory configured to store the recycle information in association with a recycle system ID usable to identify the recycle system,
the communication device being configured to transmit the recycle information at least one of
between start and end of recycling operation of recycling the refrigerant with use of the recycling, device, and
after elapse of predetermined time from the end of the recycling operation.

2. The recycle information management system according to claim 1, wherein
the communication device is further configured to transmit information on a type of a refrigerant to be recycled.

3. The recycle information management system according to claim 1, wherein
the recycle system further includes a weight measurement device configured to measure weight of the refrigerant recycled by the recycling device, and
the recycle information includes information on the weight of the recycled refrigerant.

4. The recycle information management system according to claim 1, wherein
the recycle system further includes a composition analyzing device configured to analyze composition of the refrigerant recycled by the recycling device, and
the recycle information includes information on the composition of the recycled refrigerant.

5. The recycle information management system according to claim 1, wherein
the computer further includes a processor configured to diagnose a degraded state of the recycling device based on the recycle information.

6. A recycle intbrmation management system comprising:
a communication device configured to transmit, via a network, recycle information acquired from a recycle system at least including a recycling device configured to remove at least oil from a collected refrigerant to recycle the refrigerant, the recycling device including an electrostatic separation device configured to remove oil from a collected refrigerant; and
a computer including a memory configured to store the recycle information in association with a recycle system ID usable to identify the recycle system,
the recycling device further including
a compressor, and
the recycle information including at least one of
information on a period of use of the compressor,
information on applied voltage to the compressor,
information on applied current to the compressor,
information on a period of use of the electrostatic separation device,
information on applied voltage to the electrostatic separation device, and
information on applied current to the electrostatic separation device.

7. The recycle information management system according to claim 6, wherein
the communication device is configured to transmit the recycle information at least one of
between start and end of recycling operation of recycling the refrigerant with use of the recycling device, and
after elapse of predetermined time from the end of the recycling operation.

8. A recycle information management system comprising:
a communication device configured to transmit, via a network, recycle information acquired from a recycle system at least including a recycling device configured to remove moisture from a collected refrigerant to recycle the refrigerant, the recycling device including a filter dryer configured to remove moisture from the collected refrigerant, and
a computer including a memory configured to store the recycle information in association with a recycle system ID usable to identify the recycle system,
the recycle information including filter replacement information indicating at least one of
whether or not the filter dryer needs to be replaced, and
whether or not the filter dryer has been replaced.

9. The recycle information management system according to claim 8, wherein
the recycling device further includes
a compressor, and
the recycle information includes at least one of
information on a period of use of the compressor,
information on applied voltage to the compressor,
information on applied current to the compressor,
information on a period of use of the electrostatic separation device,
information on applied voltage to the electrostatic separation device, and
information on applied current to the electrostatic separation device.

10. A recycle information management system comprising;
a communication device configured to transmit, via a network, recycle information acquired from a recycle system at least including a recycling device configured to remove at least oil from a collected refrigerant to recycle the refrigerant, the recycling device including an electrostatic separation device configured. to remove oil from a collected refrigerant; and
a computer including a memory configured to store the recycle information in association with a recycle system ID usable to identify the recycle system,
the recycle system further including an inspection device configured to inspect appropriateness regarding quantity of at least one of oil, moisture, and acid content in the refrigerant recycled by the recycling device, and
the recycle information including a result of inspection by the inspection device.

11. A recycle information management system. comprising:
a communication device configured to transmit via a network, recycle information acquired from a recycle system at least including a recycling, device configured to remove at least oil from a collected refrigerant to recycle the refrigerant, the recycling device including an electrostatic separation device configured to remove oil from a collected refrigerant; and
a computer including a memory configured to store the recycle information in association with a recycle system ID usable to identity the recycle system,
the communication device being configured
to receive, as input information in association with the recycle system ID, at least one of
a recycle cylinder ID usable to identify a recycle cylinder reserving the refrigerant to be recycled,
a name of a recycle operator recycling the refrigerant, and
a recycle operator ID usable to identify the recycle operator, and
to transmit the input information to the computer.

12. The recycle information management system according to claim 11, wherein
the computer further includes an output unit configured to output a recycle certificate certifying that the refrigerant is recycled by the recycle system, in association with the input information.

13. A recycle information management system comprising
a communication device configured to transmit, via a network, recycle information acquired from a recycle system at least including a recycling device configured to remove at least oil from a collected refrigerant to recycle the refrigerant, the recycling device including an electrostatic separation device configured to remove oil from a collected refrigerant; and
a computer including a memory configured to store the recycle information in association with a recycle system ID usable to identify the recycle system,
the memory being configured to store recycle information transmitted from a plurality of the recycle systems.

14. A management device comprising:
a processor and a memory configured to store recycle information acquired from a recycle system at least including a recycling device configured to remove at least oil from a collected refrigerant to recycle the refrigerant in association with a recycle system ID usable to identify the recycle system,
the recycling device including
a compressor, and
an electrostatic separation device configured to remove oil from a collected refrigerant, and
the recycle information including at least one of
information on a period of use of the compressor,
information on applied Voltage to the compressor,
information on applied current to the compressor,
information on a period of use of the electrostatic separation device,
information on applied voltage to the electrostatic separation device, and
information on applied current to the electrostatic separation device.

15. A management device comprising:
a processor and a memory configured to store recycle information acquired from a recycle system at least including a recycling device configured to remove moisture from a collected refrigerant to recycle the refrigerant in association with a recycle system ID usable to identify the recycle system,
the recycling device including a filter dryer configured to remove moisture from the collected refrigerant, and
the recycle information including filter replacement information indicating at least one of
whether or not the filter dryer needs to be replaced, and
whether or not the filter dryer has been replaced.

16. A management device comprising:
a processor and a memory configured to store recycle information acquired from a recycle system at least including a recycling device configured to remove at least oil from a collected refrigerant to recycle the refrigerant in association with a recycle system ID usable to identify the recycle system,
the recycling device includes an electrostatic separation device configured to remove oil from a collected refrigerant; and the recycle system further includes an inspection device configured to inspect appropriateness regarding quantity of at least one of oil, moisture, and acid content in the refrigerant recycled by the recycling device, and the recycle information includes a result of inspection by the inspection device.

17. A management device comprising:

a processor and a memory configured to store recycle information acquired from a recycle system at least including a recycling device configured to remove at least oil from a collected refrigerant to recycle the refrigerant in association with a recycle system ID usable to identify the recycle system, the recycling device including an electrostatic separation device configured to remove oil from a collected refrigerant, and the memory being configured to store recycle information transmitted from a plurality of the recycle systems.

18. A management device comprising:

a processor and a memory configured to store recycle information acquired from a recycle system at least including a recycling device configured to remove at least oil from a collected refrigerant to recycle the refrigerant in association with a recycle system ID usable to identify the recycle system, the recycling device including an electrostatic separation device configured to remove oil from a collected refrigerant; and a communication unit configured to receive, as input information in association with the recycle system ID, at least one of a recycle cylinder ID usable to identify a recycle; cylinder reserving the refrigerant to he recycled, a name of a recycle operator recycling the refrigerant, and a recycle operator ID usable to identify the recycle operator, and to transmit the input information to a computer.

* * * * *